Feb. 24, 1931. A. R. HAAG 1,794,172
WRINGER
Filed Jan. 6, 1928 2 Sheets-Sheet 1

INVENTOR
Albert R. Haag
PER Tefft and Tefft
ATTORNEYS

Feb. 24, 1931.  A. R. HAAG  1,794,172
WRINGER
Filed Jan. 6, 1928  2 Sheets-Sheet 2
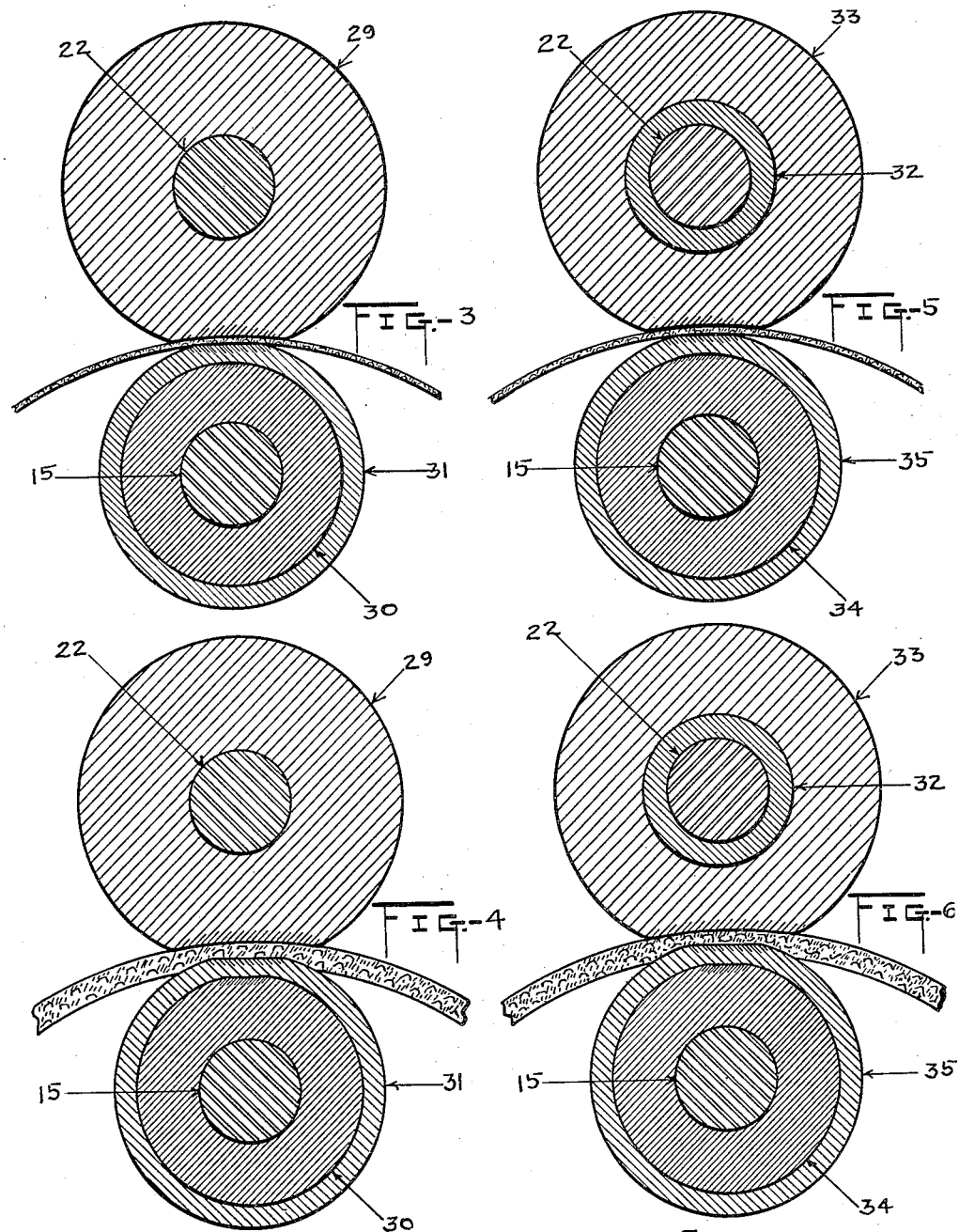

Patented Feb. 24, 1931

1,794,172

UNITED STATES PATENT OFFICE

ALBERT R. HAAG, OF PEORIA, ILLINOIS

WRINGER

Application filed January 6, 1928. Serial No. 244,792.

This invention relates to wringer mechanism, and more particularly to the roller members included in the wringer assembly.

One of the objects of the invention is in the provision of a wringer frame having included therein roll members of such flexibility as to permit the passage therethrough of various shapes and forms of garments with a comparatively uniform wringing action, irrespective of the before mentioned shape or form of the clothes.

Another object is in the provision of a wringer wherein there is utilized roll members of such flexibility as to minimize greatly the possibility of accidents in case the operator should have his or her fingers caught in the wringer.

A still further object of the invention lies in the provision of roll members for use in connection with the conventional washing machine wringer, one of said roll members being formed of soft rubber and the other roll member of somewhat smaller diameter of a hard rubber coating about the central shaft and a soft rubber layer about the hard rubber core.

A still further object of the invention is in the provision of roll members for wringers, one of said roll members having the hard rubber core immediately surrounding the central shaft and a soft rubber coating about the hard rubber core, the other roll being formed with a hard rubber core of somewhat larger diameter about the central shaft and an even smaller diameter of soft rubber disposed about the before mentioned hard rubber core immediately surrounding the shaft.

Other objects of the invention will appear in the following specification, taken in connection with the annexed drawings, in which—

Fig. 3 is a cross-sectional view, of one of the forms of wringer rolls;

Fig. 4 is a similar view, showing the same character of roll, operating upon material of considerably greater thickness;

Fig. 5 is a cross-sectional view of the other form of flexible wringer roll; and Fig. 6 is a similar view, same showing the manner of operating upon material of greater thickness.

Figure 1:
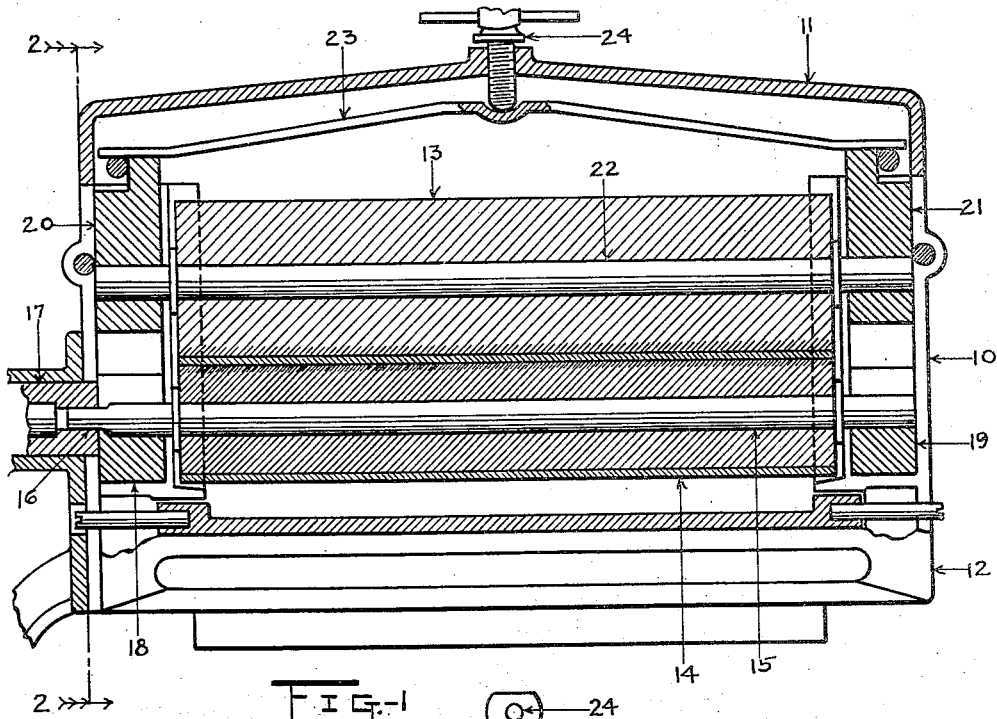
Fig. 1 is an elevational view, partially in section, showing my wringer frame with the flexible roll members mounted therein.

Before referring specifically to the drawings, it might be stated that wringer rolls heretofore used have ordinarily been of somewhat smaller diameter, and most of the rolls being either of the same consistency or in some cases, one of the rolls has been formed of soft rubber and the other roll of hard rubber.

Present applicant desires to maintain the advantages that are apparent in the use of hard rolls as well as the advantages that attend the use of rolls of varying flexibility. In order to attain the advantages which he desires, in the present instance, he has changed, or rather varied, the consistency of the rubber in the two rolls to accomplish not only a satisfactory and efficient wringing action but also to attain the advantage of increased flexibility between the rolls for the purpose of more efficiently wringing materials of varying thicknesses that pass therethrough. Inasmuch as the present invention is directed solely to the wringer rolls, it is thought that only a brief description of the wringer mechanism is necessary, due to the fact that the roll members might just as well be mounted in any of the well known or various forms of wringer mechanism.

A wringer frame has been designated generally 10, and this wringer frame includes a top portion 11 and a base 12. Within the frame are mounted the roller members which have been generally referred to as 13 and 14, 13 being the upper roll and 14 the lower roll respectively. The lower roll may be referred to as the power roll, inasmuch as the central shaft 15 thereof has its projecting end 16 fashioned in a manner to be engaged by a horizontally disposed wringer drive shaft 17, only a portion of which has been shown herein.

There is no change whatsoever in the mounting of the rolls other than the conventional mounting which includes the use of bearing blocks 18 and 19 for the lower roll and similarly formed bearing blocks 20 and 21 for the upper roll. These plural bearing blocks find their mounting in guideways formed in the wringer frame previously designated 10. The upper bearing blocks 20 and 21 support in a natural and normal manner the central shaft 22 of the upper roll 13. Means for varying the pressure between the rolls, as well as applying the initial pressure, which is necessary if the lower roll is to drive the upper roll, is found in a horizontally disposed flat spring 23 conventional in form and having its outer end abutting the upper sides of the bearing blocks 20 and 21. A manually operable screw tensioning member 24 is threaded in the upper frame 11 of the wringer in a manner to bear against the upper side of the spring and, as stated before, varying the tension between the rolls. This manually operable member 24 is also a means for not only adjusting the tension between the rolls but acts as a means to distribute the pressure evenly throughout the bearing surface between the rolls.

Figure 2:
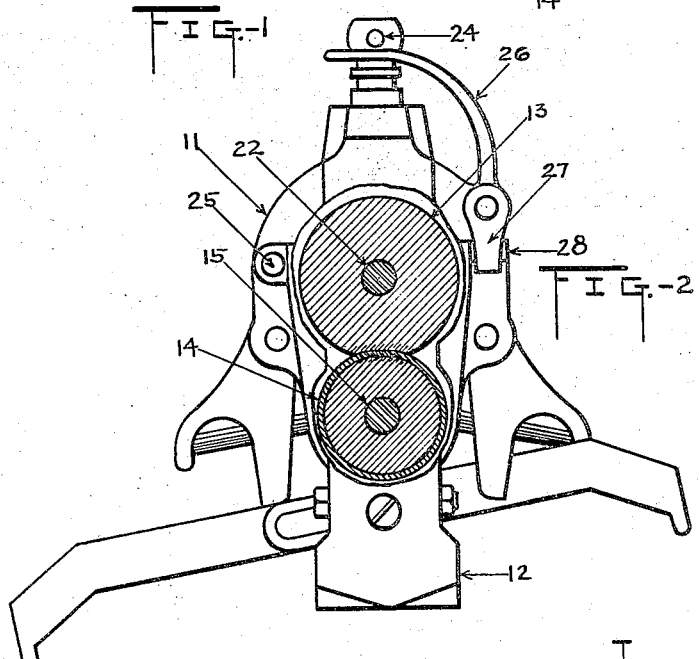
Fig. 2 is a cross-sectional view, taken on the line 2—2 of Fig. 1.

We have now described the general make-up of the wringer and when we turn to Fig. 2, we find shown therein the means for releasing the upper roll which is contained in the upper frame of the wringer whenever it is desired to quickly release the tension between the rolls in case of accident or for other reasons. We find that the upper frame 11 is pivoted at 25 to the lower frame and is held in the normal position with respect to the lower frame by a catch member 26 having its lower portion 27 fashioned to engage an outwardly projecting lug portion 28 on the lower frame. It is apparent that by manually striking the quick release lever 26 the upper frame carrying the upper roll will immediately and quickly be released in a manner to relieve the pressure between the rolls and in case the operator has his hand caught between the wringer rolls the pressure thereon will immediately be released by striking the member 26. It might be stated now that as far as the wringer structure is concerned and the quick release mechanism therefor, it might as well be changed and any type of wringer or quick release mechanism just as well used in combination with the now to be described flexible wringer roll.

In Figs. 3 to 6 respectively, there has been shown my flexible formation of the wringer rolls for the conventional clothes wringer. In Fig. 3 we find the central shaft surrounded by a soft rubber coating 29. The lower roll has a hard rubber coating 30 immediately surrounding the central shaft and a layer of less diameter of soft rubber 31 immediately surrounding the hard layer 30. In this figure, there is shown the passage of materials between the rolls and the manner that pressure is applied to same in passage between the rolls. We find that the two wringer rolls conform in somewhat similar manner to the material that passes therethrough, however, in a manner to substantially completely wring the water that is contained in the material, the rolls conforming to the shape of the material passing therethrough because of the extreme softness of the outer layers on both rolls and the effective wringing action being made possible by virtue of the relatively reduced mean elasticity of the lower roll as compared to that of the upper roll. When we turn to Fig. 4, however, we find that rolls of a similar character wringing a material of considerably greater thickness, it being apparent that the operation of the rolls is substantially the same with the exception of their increased flexibility, apparent mainly in the fact that the rolls do not press as deeply into the material. As stated before, it is the object in using rolls of the above described character to have same conform, in a substantially uniform manner, to the varying thicknesses of material that passes therethrough, however, with the same efficiency as respects the wringing operation.

When we turn to Figs. 5 and 6, we find that the upper roll which is in every instance of somewhat greater diameter than the lower roll, said roll has a surrounding layer of small diameter of hard rubber 32 about the central shaft. Immediately surrounding this hard rubber core is a layer of considerably greater diameter of soft rubber, the same being designated 33. The lower roll has a rather considerable layer of hard rubber 34 immediately surrounding the central shaft and a layer of considerably less diameter of soft rubber 35 immediately surrounding the hard rubber 34.

Although this second form of wringer roll formation differs somewhat from that before described, as respects the varying consistency of the surrounding layers of rubber, nevertheless, the same principle of, or rather the same mode of, operation on the material passing therethrough is exactly the same, as may be seen from a careful consideration of Figs. 5 and 6, wherein the material that passes between the rolls is shown of varying thickness. However, the manner of operation of the rolls upon this material is substantially the same, and the rolls are sufficiently flexible as to conform to the varying thicknesses of material, however, at the same time efficiently wringing the water therefrom. Inasmuch as the structural make-up of the wringer and the formation of the roll members has been described somewhat in detail and due to the simplicity of structure it is not thought necessary to go into detail description of the operation of the roll members other than to say that by using the combination of the roll members, one of which is formed of soft rubber, or one having a hard rubber core and a soft rubber coating and a second roll having either a hard rubber core and a soft rubber coating thereon, the advantages which normally attend the use of conventional wringer rolls which are formed of hard rubber and the advantages that attend the use of roll members wherein one roll is formed of comparatively soft rubber and the other of hard rubber are gained in the combination of roll members and the consistencies described herein.

It is apparent, when one considers the nature of the roll members described herein, that both of the rolls include upon their outer surface either a thick or a thin coating or layer of soft rubber. This coating of the rolls upon their outer surfaces with soft rubber permits the considerable flexing of the rolls during the wringing operation. In other words, this flexible outer coating of the rolls permits them to conform to the varying sizes and forms of materials that pass therethrough. We will also notice that in both forms described herein one of the rolls includes a hard rubber inner layer which operates to assist the wringing of the water from the materials that pass between the rolls of the wringer without decreasing to any great extent the above mentioned flexible action, of the rolls.

The present invention also comprehends the use of some other material than hard rubber, which will act as a resistance member to the layer of soft rubber. It would be impossible to construct an efficient roll member by using a non-flexible material.

What I claim is:

1. In a wringer of the character described, the combination of a pair of wringer rolls, one of said rolls comprising a rigid shaft immediately surrounded by a layer of very small thickness of hard rubber and a surrounding layer of larger thickness of soft rubber, and a second roll comprising a central shaft, a layer of considerable thickness of hard rubber immediately surrounding said shaft and a second layer of lesser thickness of very soft rubber surrounding said hard rubber layer.

2. In a wringer of the character described, the combination of a pair of wringer rolls, one of said wringer rolls being of great mean elasticity, the other wringer roll being of relatively less mean elasticity, the last mentioned roll having a comparatively thin outer covering of material approaching that of the first mentioned roll in elasticity.

3. In a wringer of the character described, the combination of a pair of wringer rolls one of which is larger in diameter than the other and the major portion of which is of relatively soft rubber, the other roll having a core of relatively hard rubber and a thin layer of relatively soft rubber surrounding said core.

In testimony whereof I have hereunto affixed my signature.

ALBERT R. HAAG.

CERTIFICATE OF CORRECTION.

Patent No. 1,794,172. Granted February 24, 1931, to

ALBERT R. HAAG.

It is hereby certified that error appears in the printed specification of the above numbered patent requiring correction as follows: Page 3, line 40, claim 1, strike out the word "very" and insert the same before the word "soft" in line 42; and that the said Letters Patent should be read with this correction therein that the same may conform to the record of the case in the Patent Office.

Signed and sealed this 14th day of April, A. D. 1931.

(Seal)

M. J. Moore,
Acting Commissioner of Patents.